United States Patent
Havlir et al.

(10) Patent No.: US 9,594,395 B2
(45) Date of Patent: Mar. 14, 2017

(54) CLOCK ROUTING TECHNIQUES

(71) Applicant: Apple Inc., Cupertino, CA (US)

(72) Inventors: Andrew M. Havlir, Austin, TX (US); James S. Blomgren, Austin, TX (US); Terence M. Potter, Austin, TX (US)

(73) Assignee: Apple Inc., Cupertino, CA (US)

(*) Notice: Subject to any disclaimer, the term of this patent is extended or adjusted under 35 U.S.C. 154(b) by 426 days.

(21) Appl. No.: 14/160,179

(22) Filed: Jan. 21, 2014

(65) Prior Publication Data

US 2015/0205324 A1    Jul. 23, 2015

(51) Int. Cl.
*G06F 1/10* (2006.01)
*G06F 9/38* (2006.01)
*G06F 9/30* (2006.01)
*G06F 1/32* (2006.01)

(52) U.S. Cl.
CPC ............ *G06F 1/10* (2013.01); *G06F 1/32* (2013.01); *G06F 9/30014* (2013.01); *G06F 9/3869* (2013.01); *G06F 9/3871* (2013.01); *G06F 9/3887* (2013.01)

(58) Field of Classification Search
CPC ....... G06F 1/10; G06F 1/30007; G06F 1/3867
USPC .......................................................... 713/600
See application file for complete search history.

(56) References Cited

U.S. PATENT DOCUMENTS

| | | | | |
|---|---|---|---|---|
| 6,848,060 B2* | 1/2005 | Cook | ............... | G06F 9/3869 710/52 |
| 7,519,797 B1* | 4/2009 | Stiehl | ............... | G06F 9/3867 712/225 |
| 7,791,394 B2 | 9/2010 | Schmid et al. | | |
| 7,802,118 B1 | 9/2010 | Abdalla et al. | | |
| 2003/0005261 A1* | 1/2003 | Sheaffer | ............... | G06F 9/3824 712/35 |
| 2004/0268104 A1* | 12/2004 | Cooper | ............... | G06F 15/7821 712/245 |
| 2012/0013627 A1 | 1/2012 | Shah et al. | | |

(Continued)

OTHER PUBLICATIONS

Sjogren, A.E., and C.J. Myers. "Interfacing Synchronous and Asynchronous Modules within a High-speed Pipeline." Advanced Research in VLSI, 1997. Proceedings., Seventeenth Conference (1997): 47-61. Web.*

*Primary Examiner* — Thomas Lee
*Assistant Examiner* — Sumil Desai
(74) *Attorney, Agent, or Firm* — Meyertons, Hood, Kivlin, Kowert & Goetzel, P.C.

(57) ABSTRACT

Techniques are disclosed relating to clock routing techniques in processors with both pipelined and non-pipelined circuitry. In some embodiments, an apparatus includes execution units that are non-pipelined and configured to perform instructions without receiving a clock signal. In these embodiments, one or more clock lines routed throughout the apparatus do not extend into the one or more execution units in each pipeline, reducing the length of the clock lines. In some embodiments, the apparatus includes multiple such pipelines arranged in an array, with the execution units located on an outer portion of the array and clocked control circuitry located on an inner portion of the array. In some embodiments, clock lines do not extend into the outer portion of the array. In some embodiments, the array includes one or more rows of execution units. These arrangements may further reduce the length of clock lines.

15 Claims, 8 Drawing Sheets

(56) References Cited

U.S. PATENT DOCUMENTS

| | | |
|---|---|---|
| 2012/0317434 A1 | 12/2012 | Tran |
| 2014/0229720 A1* | 8/2014 | Hickey .................. G06F 1/324 |
| | | 712/240 |
| 2014/0333635 A1* | 11/2014 | Demouth .................. G06T 1/20 |
| | | 345/505 |
| 2014/0351563 A1* | 11/2014 | Vorbach ................ G06F 9/3885 |
| | | 712/221 |

\* cited by examiner

CLOCK ROUTING TECHNIQUES

BACKGROUND

Technical Field

This disclosure relates generally to computer processing and more specifically to clock routing techniques in processors with both pipelined and non-pipelined circuitry.

Description of the Related Art

Graphics processing units (GPUs) typically operate on large amounts of graphics data in parallel using multiple execution pipelines or shaders. Modern GPUs are becoming more and more programmable, with less computation done in fixed-function hardware and more computation done using programmable shaders that execute graphics instructions from application developers. Execution of such instructions may consume considerable power. This may be problematic in mobile graphics applications where a battery is the power source.

Clock signals typically consume significant power, e.g., because they are usually the most active lines in a processing unit. Decreasing the length of clock routing pathways may reduce power consumption. However, pipelined processors typically rely on clock signals to time transfer of data between pipeline stages and clock lines are typically routed throughout the pipeline. In the GPU context, programmable shaders often include large numbers of graphics processing pipelines.

SUMMARY

Techniques are disclosed relating to clock routing techniques in processors with both pipelined and non-pipelined circuitry.

In some embodiments, an apparatus includes execution units that are non-pipelined and are configured to perform instructions without using or receiving a clock signal. In these embodiments, one or more clock lines are routed throughout the apparatus but do not extend into the one or more execution units in each pipeline, reducing the length of the clock lines. In some embodiments, the execution units do not include clocked storage elements. This may reduce power consumption and/or increase performance.

In some embodiments, the apparatus includes multiple such pipelines arranged in an array, with the execution units located on an outer portion of the array and clocked control circuitry located on an inner portion of the array. In some embodiments, clock lines do not extend into the outer portion of the array. In some embodiments, the array includes one or more rows of execution units. This may further reduce the length of clock lines in the apparatus.

In some embodiments, a split datapath may be configured to allow efficient clock gating of clock lines for clocked front-end circuitry in pipelines that include non-pipelined control units.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
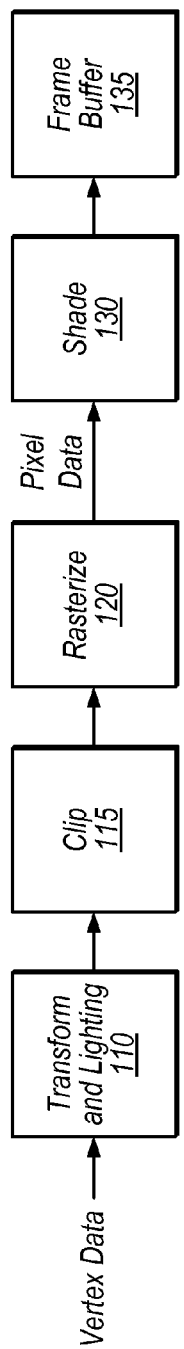
FIG. 1A is a block diagram illustrating an exemplary graphics processing flow.
Figure 1B:
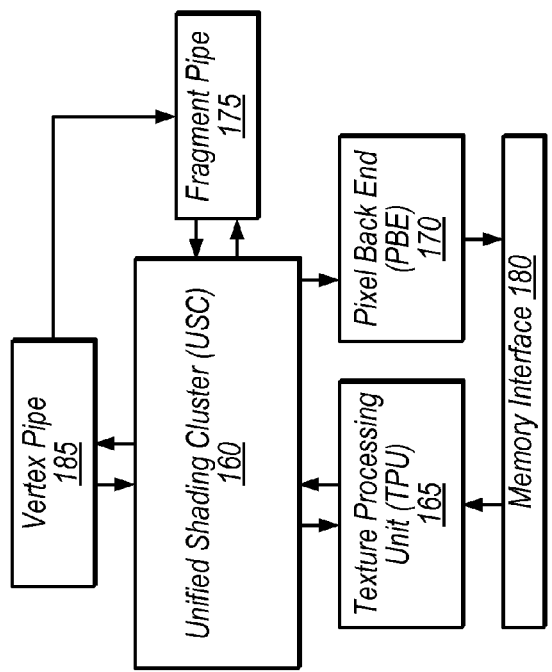
FIG. 1B is a block diagram illustrating one embodiment of a graphics unit.

This disclosure initially describes, with reference to FIGS. 1A-B, an overview of a graphics processing flow and an exemplary graphics unit. Embodiments of graphics pipeline designs and layouts are described in further details with references to FIGS. 2-7 and an exemplary device is described with reference to FIG. 8. In some embodiments, the techniques disclosed herein may greatly simplify clock trees, which may reduce power consumption during processing. The techniques disclosed herein are not exclusive to graphics processing and may also be utilized in various other types of processing.

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Figure 2:
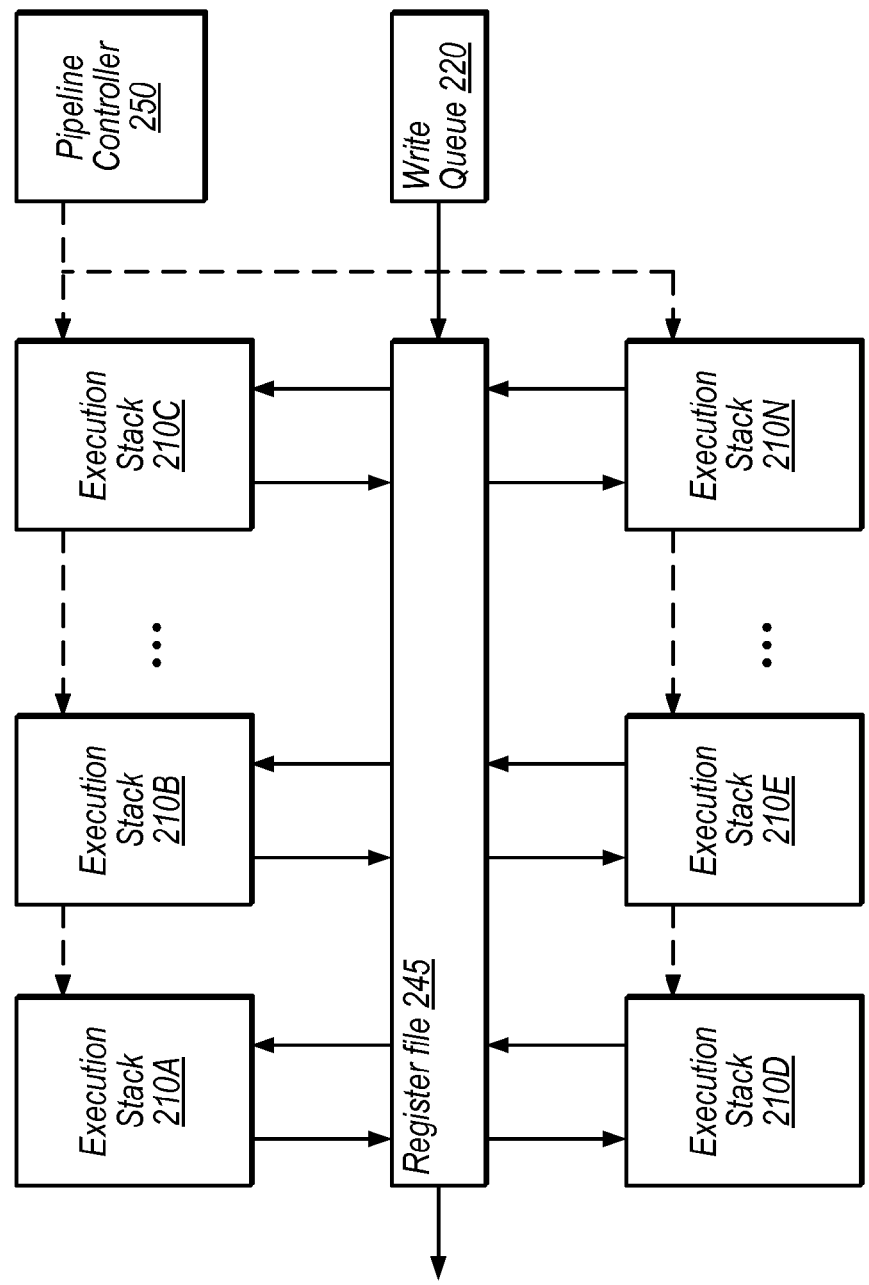
FIG. 2 is a block diagram illustrating one embodiment of a unified shading cluster.

Referring now to FIG. 2, a block diagram illustrating one embodiment of USC 160 is shown. USC 160 may also be described as a programmable shader, and may be programmable to perform various processing operations in addition to shading operations. In the illustrated embodiment, USC 160 includes execution stacks 210, write queue 220, register file 245, and pipeline controller 250. In one embodiment, USC 160 is configured to execute graphics instructions in parallel using execution stacks 210.

Write queue 220, in one embodiment, is configured to store information from other processing elements to be written to register file 245. Write queue 220, in this embodiment, is configure to write the stored data to register file 245 without conflicting with accesses by execution stacks 210A-N.

Execution stacks 210A-N, in some embodiments, may each include one or more execution units or arithmetic logic units (ALUs) such as floating-point units, integer units, shift units, bitwise operation units, etc. Execution stacks may also be referred to as "execution pipelines," "shader pipelines," or "graphics pipelines" in various embodiments. USC 160, in various embodiments, may include any number of execution stacks 210, such as 16, 128, 1024, etc. Execution stacks 210A-N may be configured to read source operands from register file 245. Execution stacks 210A-N may be configured to write execution results to register file 245 and/or internally forward results back as operands for subsequent instructions. Execution stacks 210A-N, in some embodiments, include operand cache storage to cache results and/or source operands from register file 245. Operand caches may reduce power consumption used in reading and writing operands. Execution stacks 210A-N may be configured to operate on multiple threads in parallel. Execution stacks 210A-N, in one embodiment, may be arranged in 2×2 groups of four.

Pipeline controller 250, in the illustrated embodiment, is configured to control execution stacks 210 via the couplings illustrated using dashed lines. In one embodiment, pipeline controller 250 is configured to send the same control signals to all execution stacks 210 such that execution stacks 210 process the same instruction in a given cycle. Because graphics processing typically involves operations on large blocks of data in parallel, using the same control signals for execution stacks 210 may reduce power consumption compared to individually controlling each execution stack.

Register file 245 may be implemented using any of various appropriate storage structures. Register file 245, in one embodiment, may include a hundred registers or more for each execution stack 210, which may be distributed across multiple banks. In one embodiment, each of these banks may be separately accessed. In one embodiment, each bank of register file 245 includes registers for multiple execution stacks 210. This may reduce register file access conflicts between execution stacks 210 because each bank read may provide data for multiple execution stacks, while different registers on different banks may be accessed in the same cycle. In other embodiments, register file 245 may not be split into multiple banks, but may include multiple read ports. However, splitting register file 245 into multiple banks may reduce power consumption and/or area compared to implementing a multi-ported storage element. Register file 245, in one embodiment, is configured to store both fragment and vertex data.

Each execution stack 210 may be configured to process multiple threads at a time, in order to use pipeline resources more efficiently (e.g., in order to reduce pipeline stalling). This multi-threaded configuration may allow for greater power efficiency and/or performance advantages in some embodiments.

Exemplary Processing Pipeline with Pipelined Execution Unit(s)

Figure 3:
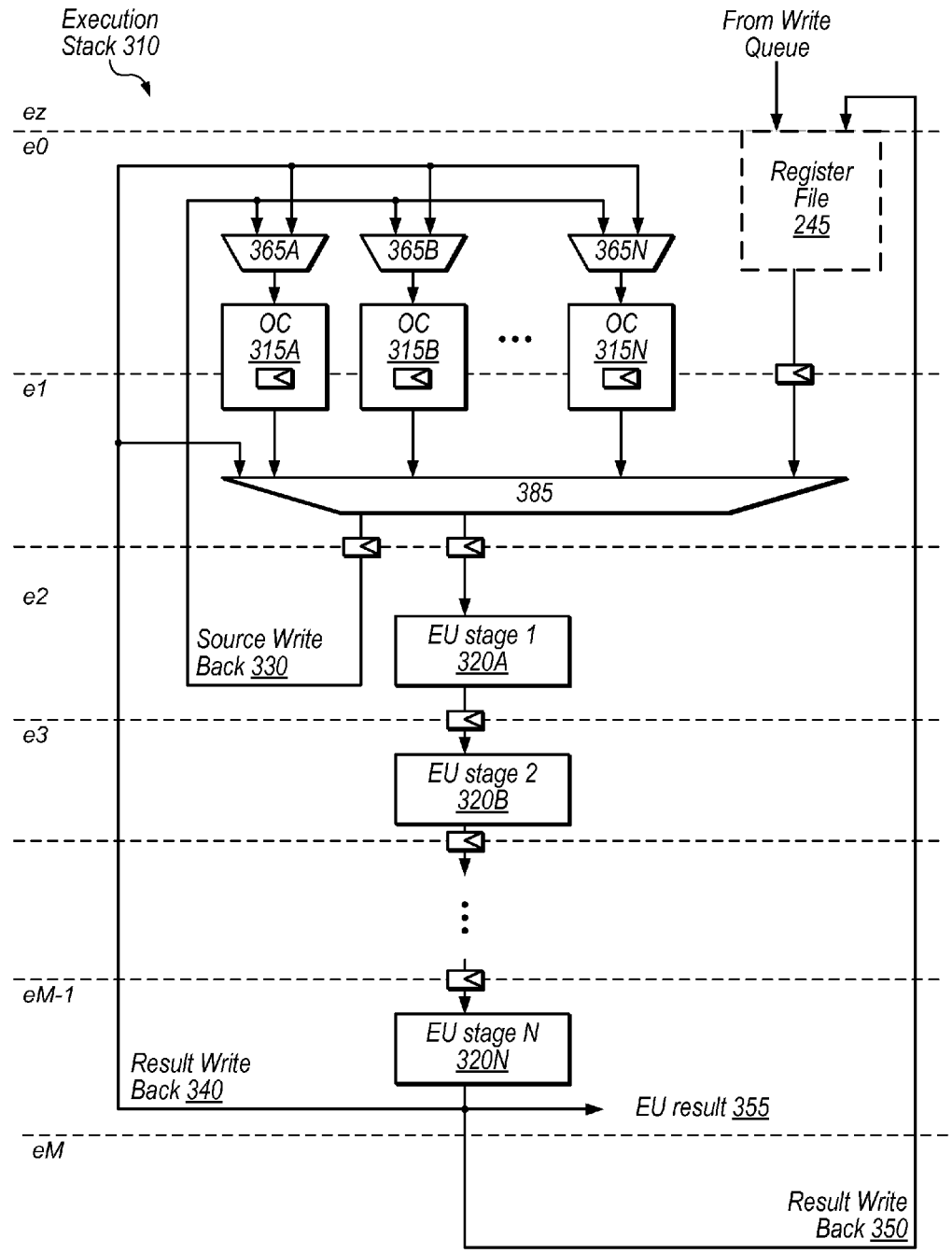
FIG. 3 is a block diagram illustrating one embodiment of an execution stack.

Referring now to FIG. 3, a block diagram illustrating one embodiment of an execution stack 310 is shown. In the illustrated embodiment, execution stack 310 includes operand caches 315A-N, MUXs 365A-N and 385, and execution unit (EU) stages 320A-N. In the illustrated embodiment, register file 245 is shown using dashed lines to indicate that register file 245 may not be considered part of execution stack 310 (e.g., register file 245 may be shared between multiple execution stacks). In the illustrated embodiment, the horizontal dashed lines mark boundaries between pipeline stages, and one or more clocked storage elements (such as flip flops, for example) are used to store data between stages. Thus, for example, in the illustrated embodiment, stage "e1" is adjacent to stages "e0" and "e2." In the illustrated embodiment, there is a clocked storage element between each execution unit stage.

As used herein, the term "pipeline" includes its well-understood meaning in the art, which includes a sequence of processing elements where the output of one element is the input of a next element, and the elements each perform different functionality for a given operation (e.g., as specified by an instruction). Typically, clocked storage elements are included between pipeline stages to convey results of one stage to the next. Instruction decode, dispatch, execution, and retirement are some (non-limiting) examples of different instruction pipeline stages. In the illustrated embodiment, USC 160 may be configured to perform fetch and decode operations for graphics instructions and provide operands to execution stacks 310 for further processing. Pipelines in execution stacks 310 may be referred to as "execution pipelines" and may perform various operations on provided operands from USC 160. As used herein, the term "execution pipeline" may refer to a portion of a pipeline or an entire pipeline and includes at least an execution unit. In some embodiments, execution units are not pipelined and thus may not include clocked storage elements and may not require a clock signal to operate. Various pipeline architectures are contemplated with varying numbers and orderings of stages/elements/portions.

The terms "de-pipelined" or "non-pipelined" refer to circuitry that does not use a clock signal to perform operations or synchronize the transfer of information between stages. However, non-pipelined circuitry may perform operations by passing information from one level of circuitry (e.g., a level of gates) to another without using a clock signal. In some embodiments, non-pipelined circuitry is configured to receive only logic signal inputs, such that an output of non-pipelined circuitry will eventually stabilize for any given logic signal input. (This is in contrast, for example, to circuitry configured to oscillate when receiving a constant set of inputs.) In these embodiments, signal routing may be less constrained in comparison with pipelined implementations, because pipelined circuitry may require careful routing to handle clock skew and avoid erroneous gate inputs. In various embodiments, non-pipelined circuitry may be included in an execution pipeline and may be configured to perform operations over multiple clock cycles of the execution pipeline.

Further, as used herein, the term "clock signal" refers to a periodic signal, e.g., as in a two valued (binary) electrical signal. Circuitry configured to operate using a clock signal may not always receive a clock signal during operation of a processor. For example, the clock signal to such circuitry may be gated in order to reduce power consumption when the circuitry is not currently needed. In contrast, circuitry that is configured to operate without using a clock signal may never receive or use a clock signal and may not be coupled to routing pathways that carry a clock signal.

Execution stack 310, in some embodiments, is configured to execute graphics operations using EU 320. EU 320 may include a floating-point unit and a complex unit, for example, along with any of various additional functional blocks. In the illustrated embodiment, EU 320 is configured to perform operations over at least N cycles and includes at least N pipeline stages (EU 320 may include additional pipeline stages that are not shown). EU result 355 may be usable by other processing elements (not shown) at pipeline stage eM-1.

Operand caches 315A-N, in the illustrated embodiment, are configured to cache source operands from register file 245 (e.g. via source write back 330) and/or results from EU stage N (e.g. via result write back 340). MUXs 365A-N, in the illustrated embodiment, are configured to select between these inputs to each operand cache 315. Caching sources and results may improve performance and/or decrease power consumption compared to accessing data from register file 245. In one embodiment, each operand cache 315 is configured to maintain cache information such as tag state, valid state, and replacement state and may compute hits and misses. In other embodiments, this cache information is maintained by a centralized control unit of USC 160 for multiple instances at a time. In still other embodiments, operand caches 315 may be implemented as queues rather than caches. Typically, operand caches are included in an execution pipeline or very close to an execution pipeline. In one embodiment, an operand cache is a lowest-level storage element in cache hierarchy. In one embodiment, an operand cache is located between a register file and an execution pipeline, and is configured to cache operands that have been provided to the execution pipeline by the register file and/or other operand providers.

MUX 385, in the illustrated embodiment, is configured to select and provide operands for EU stage 1 320A from register file 245, operand caches 315A-N, and/or result write back signal 340. MUX 385 may be configured to provide a number of operands from one or more of these sources to EU 320, such as three operands, in one embodiment. Register file 245 may be configured as described above with reference to FIG. 2. In some embodiments, MUX 385 may be configured to receive operands from other execution stacks or other processing elements (not shown), and may assign such operands to inputs of EU stage 1 320A. MUX 385 may be referred to as "operand routing circuitry."

For the ez stage, in the illustrated embodiment, execution stack 310 is configured to initiate reads for an instruction from register file 245, if the instruction requires one or more operands from register file 245. In this embodiment, execution stack 310 is also configured to initiate a store of result write back 350 to register file 245. In some embodiments, if an instruction in the ez stage needs to read a result of an instruction in the eM stage, execution stack 310 is configured to both write the result from the eM stage to register file 245 and forward the result to make it available to the instruction in the ez stage. This may avoid the instruction in the ez stage having to access the register file to get the result.

In one embodiment, execution stack 310 is configured to store the forwarded result from the eM stage in a storage element (not shown) within execution stack 310 to be used as a source input to EU 320 when the instruction in the ez stage reaches EU 320.

For the e0 stage, in the illustrated embodiment, execution stack 310 is configured to wait for data from register file 245 and store data in one or more of operand caches 315 (e.g., using source write back 330 and/or result write back 340).

For the e1 stage, in the illustrated embodiment, execution stack 310 is configured to set up EU 320 by selecting operands from operand caches 315A-N, register file 245, and/or other operand sources (not shown). In this embodiment, execution stack 310 is also configured to provide the operands to sources of EU 320. In some embodiments, execution stack 310 may be configured to select operands to write to an operand cache 315 using source write back signal 330 and/or an operand to write to register file 245 from an operand cache 315 (routing not shown).

For the e2 stage, in the illustrated embodiment, execution stack 310 is configured to begin operating on operands using EU 320. In this embodiment, execution stack 310 is also configured to provide an operand using source write back 330 to one of operand caches 315 in stage e2.

For the e3 through eM−1 stages, in the illustrated embodiment, EU 320 is configured to continue processing operands. For stage eM−1, in the illustrated embodiment, execution stack 310 is configured to generate result write back 340 to be written to an operand cache 315 by stage e0.

For the eM stage, in the illustrated embodiment, execution stack 310 is configured to provide US result write back 350 to be written to register file 245 by stage ez.

In one embodiment, USC 160 is configured to assign a number of threads that is an integer multiple of N for execution on a pipeline. This may allow threads to continuously execute without stalling while waiting for results from EU 320. In some embodiments, USC 160 is configured to require strict ordering of threads executing on execution stack 310.

Exemplary Processing Pipeline with De-Pipelined Execution Units

Figure 4:
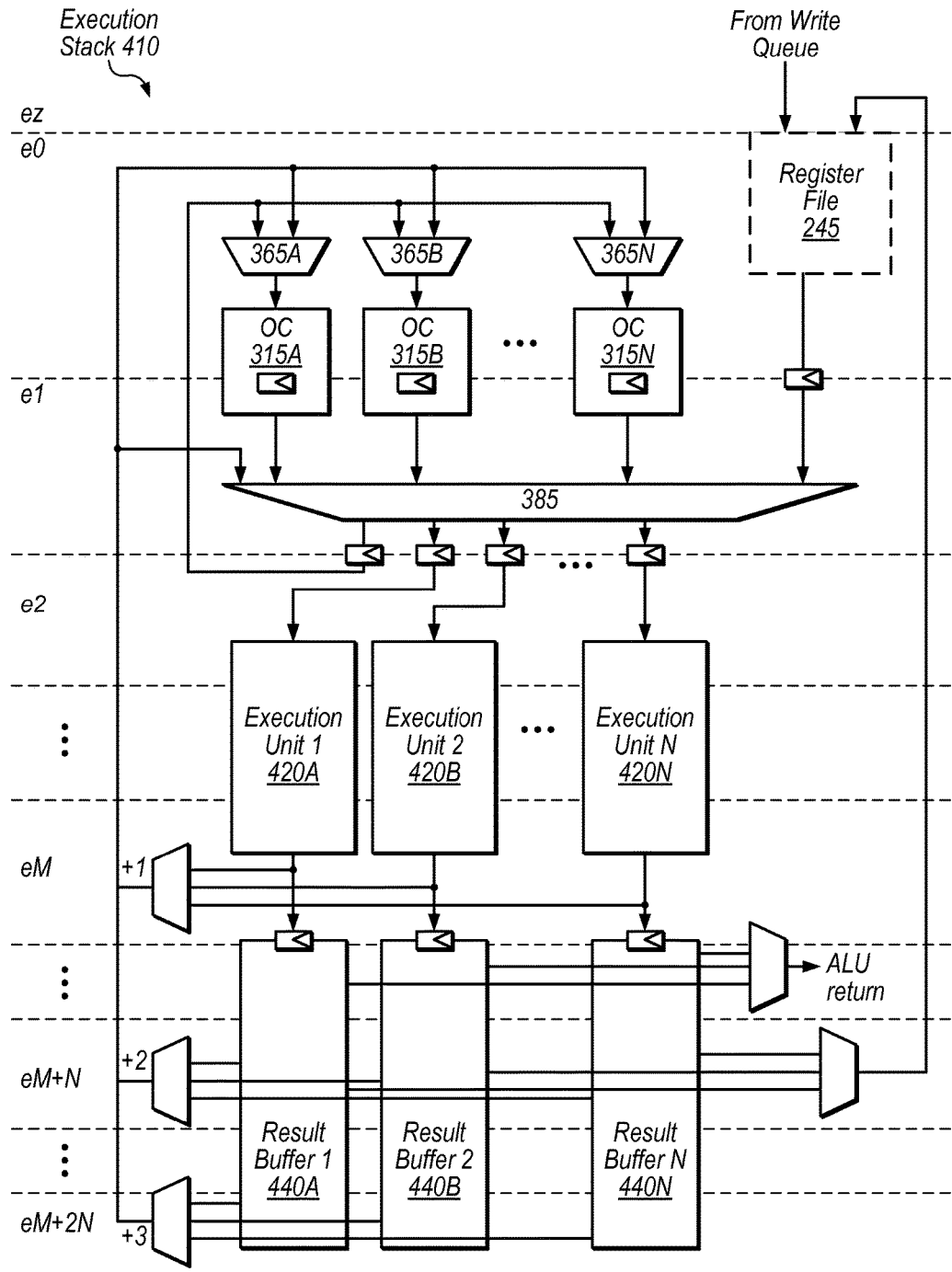
FIG. 4 is block diagram illustrating one embodiment of an execution stack that includes de-pipelined execution units.

Referring now to FIG. 4, one embodiment of an execution stack 410 that includes de-pipelined execution units is shown. In the illustrated embodiment, execution stack 410 includes operand caches 315A-N, MUXs 365A-N and 385, execution units 420A-N, result buffers 440A-N. In the illustrated embodiment, register file 245 is shown using dashed lines to indicate that register file 245 may not be considered part of execution stack 410 (e.g., register file 245 may be shared between multiple execution stacks). In the illustrated embodiment, the horizontal dashed lines mark boundaries between pipeline stages, as discussed above with reference to FIG. 3.

Operand caches 315 and MUXs 365 and 385, in some embodiments, may be configured as described above with reference to similarly numbered elements in FIG. 3.

In contrast to the execution stack of FIG. 3, execution stack 410 includes execution units 420 that are not pipelined. For example, in the illustrated embodiment, execution units 420 do not include internal clocked storage elements (such as flip-flops, for example) for storing data generated in a previous clock cycles. Rather, execution units 420, in the illustrated embodiment, are configured to perform operations without using or receiving a clock signal. In the illustrated embodiment, these execution units 420 are configured to provide an execution result after multiple clock cycles. In the illustrated embodiment, result buffers 440 include clocked storage elements. The phrase "clocked storage element" refers to circuitry configured to store information based on a clock signal. Circuitry may be referred to as a clocked storage element even when a clock signal to the circuitry has been gated or is otherwise unavailable, assuming the circuitry is configured to operate using a clock signal.

In the illustrated embodiment, execution units 420 may execute instructions for only one thread at a time (in contrast to the embodiments of FIG. 3). In some embodiments, each execution unit 420 may be configured to perform operations similar to those performed by a pipelined execution unit in the embodiment of FIG. 3. In order to execute instructions for different threads in parallel, execution stack 410 includes multiple execution units in the illustrated embodiment. Execution units 420 may be floating-point units, ALUs, shift units, or any of various additional functional blocks. In some embodiments, execution stack 410 may include multiple functional blocks of each of various types or order to perform a given type of operation for multiple threads in parallel. In the illustrated embodiment, execution units 420 are configured to perform operations over multiple clock cycles of execution stack 410 but are not pipelined.

Execution units that are configured to operate without a clock signal may result in several advantages over pipelined implementations. Internal clocked storage elements may be relatively slow, e.g., because of clock to Q delay, setup times, clock margins for skew and jitter, etc. Thus, eliminating clocked storage elements between execution unit pipeline stages may allow an execution unit to perform a given operation in a smaller amount of time by reducing the delay of a critical path. Clocked storage elements may also be relatively large and consume power and area, especially in execution units in which the internal storage elements may need to be wider than the size of the input operands. Further, as will be discussed in greater detail below with reference to FIG. 5, non-pipelined execution units may allow for physical layouts that reduce the length of clocking pathways, which may greatly reduce power consumption because active clock lines typically consume significant power. Thus, including multiple non-pipelined execution units may significantly reduce power consumption and/or increase performance in comparison with pipelined implementations such as that shown in FIG. 3.

Result buffers 440, in the illustrated embodiment, are configured to store results from respective execution units 420 for multiple clock cycles, in order to provide them to elements of execution stack 410 at appropriate times. For example, the "+2" and "+3" MUXs of FIG. 4 may be configured to provide instruction results to subsequent instructions 2 and 3 instructions after the executed instruction in a given thread. This forwarding configuration may allow execution stack 410 to execute without waiting to access results of previous instructions and/or may avoid conflicts when accessing register file 245.

The ez through e1 stages of execution stack 410 may be configured as described above with reference to the same stages of FIG. 3. For the e2 stage, in the illustrated embodiment, execution units 420 are configured to receive input operands. In one embodiment, execution stack 410 is configured to provide operands for different threads in different cycles and only one execution unit 420 receives operands in this stage.

For the eM stage, in the illustrated embodiment, one of the execution units 420 is configured to write a result to a result buffer 440 (and/or forward the result using the "+1" MUX). As shown, each execution unit 420 may be configured to perform an operation on the input operands over multiple cycles of execution stack 410. In one embodiment, an execution unit 420 may be configured to receive operands for a subsequent instruction (from a given thread) in the clock cycle after the execution unit 420 has produced a result.

The illustrated configuration of execution stack 410 is intended to be exemplary and non-limiting; in other embodiments, pipeline elements of execution stack 410 may be rearranged or omitted and additional pipeline elements may be included. In some embodiments, any combination of one or more of the improvements or optimizations described herein may be included and some or all of the improvements or optimizations may be omitted. In other embodiments, any of various appropriate pipeline configurations may be implemented.

Figure 5:
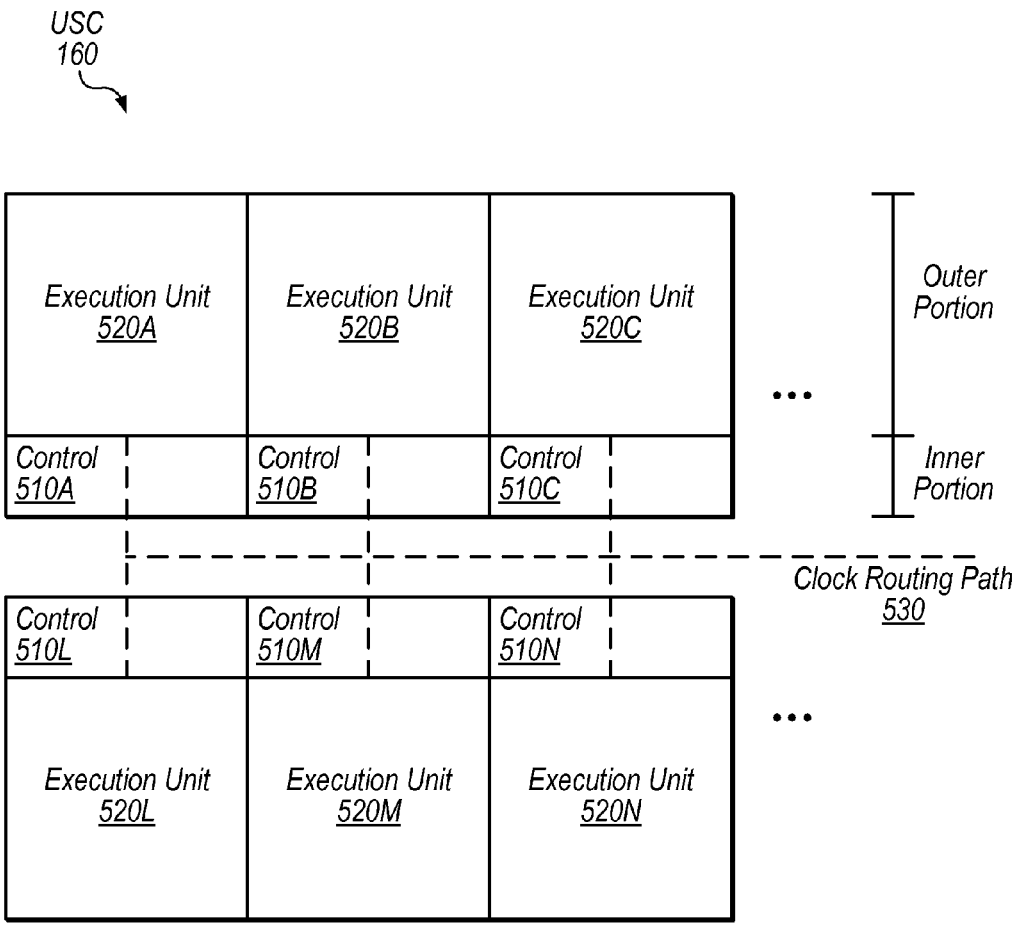
FIG. 5 is a block diagram illustrating one embodiment of an exemplary layout of a unified shading cluster that includes multiple execution stacks.

Referring now to FIG. 5, a block diagram illustrating one embodiment of a physical layout of USC 160 is shown. In the illustrated embodiment, USC 160 includes execution units 520A-N, corresponding control circuitry 510A-N, and clock routing path 530 (illustrated using dashed lines).

In some embodiments, control circuitry 510 may include pipelined front-end circuitry such as operand caches 315, MUX 385, and result buffers 440, for example. Control circuitry 510 may include various datapath logic. In the illustrated embodiment, clock routing path 530 extends into control circuitry 510 and is configured to provide a clock signal to control circuitry 510. In the illustrated embodiment, clock routing path 530 does not extend into execution units 520. Execution units 520, in the illustrated embodiment, are configured to perform various operations without using a clock signal. As shown, because clock routing path 530 does not extend into execution units 520, power consumption may be significantly reduced in comparison to routing clock signals throughout USC 160 (note that the clock routing path may extend horizontally and throughout control circuitry 510A-N, although these lines are not shown).

In some embodiments, USC 160 includes clocked storage elements between each execution unit 520 and its corresponding control circuitry 510 and the clocked storage elements are configured to store operands and results for each execution unit 520.

In various embodiments, USC 160 is arranged in an array of execution units with clock routing path 530 restricted to an inner portion of the array and not extending into execution units located on the outer portion of the array. In the illustrated embodiment, USC 160 is arranged in an array of two rows with clocked control circuitry on the inside portion of each row. In one embodiment, register file 245 may be located between the two rows.

In other embodiments, other arrays may be used, including three-dimensional arrays, for example. In three-dimensional arrays, execution units may be stacked above each other in a rectangular or cylindrical fashion with clock routing paths restricted to inner portions of the three-dimensional array and not extending into execution units located on the outer portion of the three-dimensional array.

Figure 6:
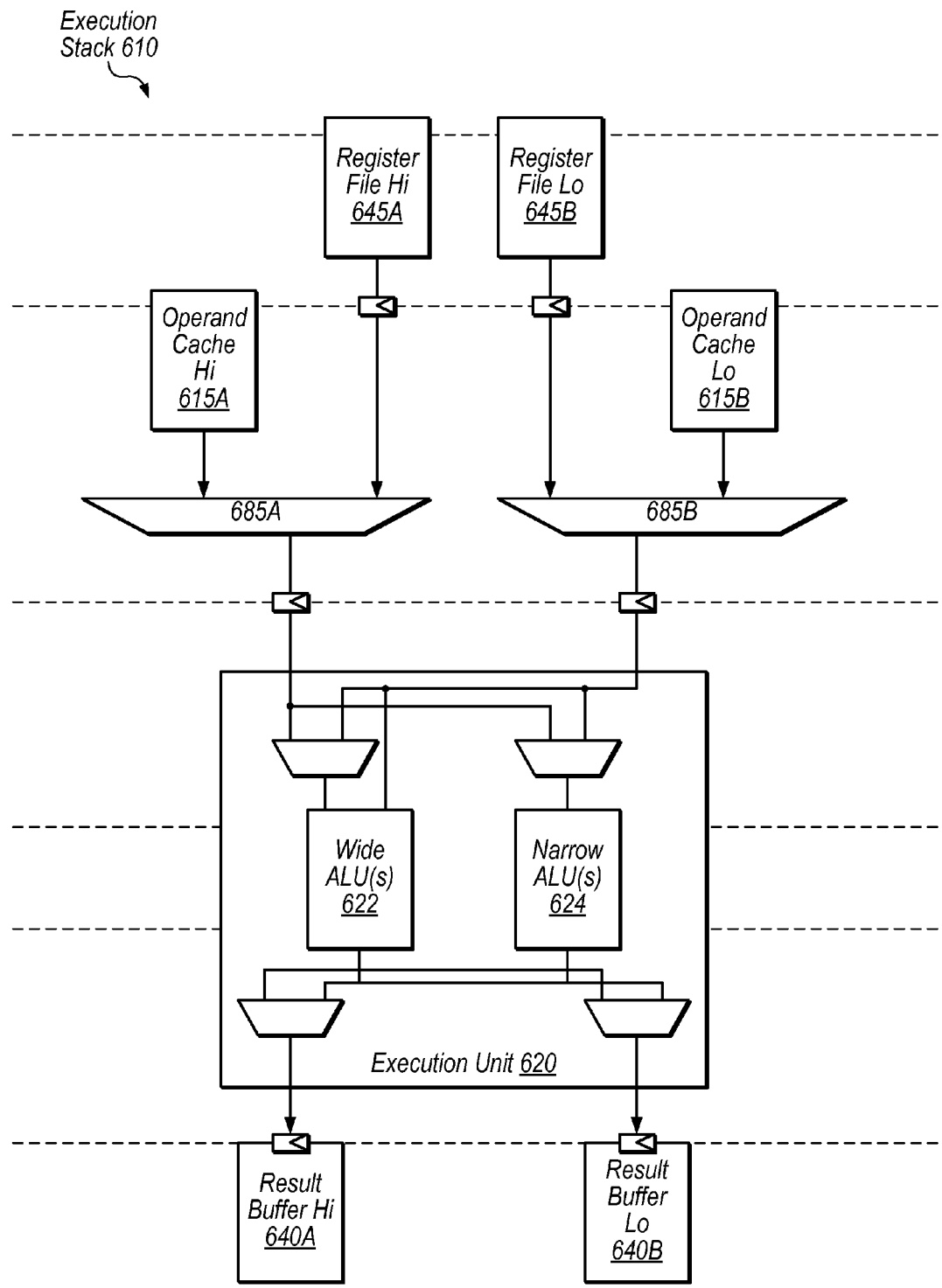
FIG. 6 is a block diagram illustrating one embodiment of an execution stack with split front-end circuitry.

Referring now to FIG. 6, a block diagram illustrating one embodiment of an execution stack 610 with a split datapath is shown. In the illustrated embodiment, execution stack 610 includes register file 645, operand cache 615, MUX 685, execution unit 620, result buffer 640, and various clocked storage elements between pipeline stages.

In the illustrated embodiment, pipelined front end circuitry (e.g., register file 645, operand cache 615, and MUX 685) and result storage elements (e.g., result buffer 640) are split and separately controlled. In one embodiment, register file 645, operand cache 615, and execution unit 620 may be configured to process instructions for one thread at a time (e.g., they may correspond to one set of circuitry of FIG. 4 such as elements 315A, 385, 420A and 440A). In the illustrated embodiment, the hi and lo portions of operands intersect only within execution unit 620.

Execution unit 620, in the illustrated embodiment, includes wide ALU(s) 622 and narrow ALU(s) 624. In the illustrated embodiment, execution unit 620 does not include internal clocked storage elements and is configured to perform operations without receiving a clock signal.

Result buffer 640, in the illustrated embodiment includes hi and lo portions configured to store hi and low portions of results from execution unit 620. In some embodiments, result buffer is configured as described above with reference to FIG. 4.

The split datapath of FIG. 6 may allow efficient processing when using operands of different widths, in some embodiments, especially in embodiments that use an H-tree structure for clocking pathways. For example, some operands may be 16 bits or converted to 16 bits for operation in a 16-bit mode, although execution stack 610 may be configured to operate on 32-bit operands. (The particular numbers of bits are exemplary only, in various embodiments, execution stack 610 may be configured to operate on operands having any of various numbers of bits split into any number of portions. Further, the hi and lo portions may or may not include the same numbers of bits.) In these embodiments, execution stack 610 may be configured to clock gate, data gate, or otherwise power-down the "hi" elements of FIG. 6 and wide ALU(s) 622 in order to reduce power consumption when operating on 16-bit operands using the "lo" elements of FIG. 6 and narrow ALU(s) 624.

Execution stack 610, in some embodiments, includes separate control circuitry for controlling the hi and lo portions of the datapath. This may reduce power consumption, because logic in one lane does not switch when the other lane is being controlled.

In one embodiment, the circuitry for the hi and lo portions is physically separated. For example, in FIG. 5, the hi circuitry may be located on one side of clock routing path 530 and the lo circuitry on the other side. This may allow for efficient clock gating of clock lines (not shown) extending from the clock trunk in each instance of control circuitry 510, when the hi circuitry is powered down, for example. For example, clock gating circuitry may be placed very close to the clock trunk (the portion of the clock routing path shown in FIG. 5). In the embodiment shown in FIG. 5, execution units 520 may be configured to operate using hi and/or lo portions of operands and then provide hi and lo portions of results separately to control circuitry 510.

Figure 7:
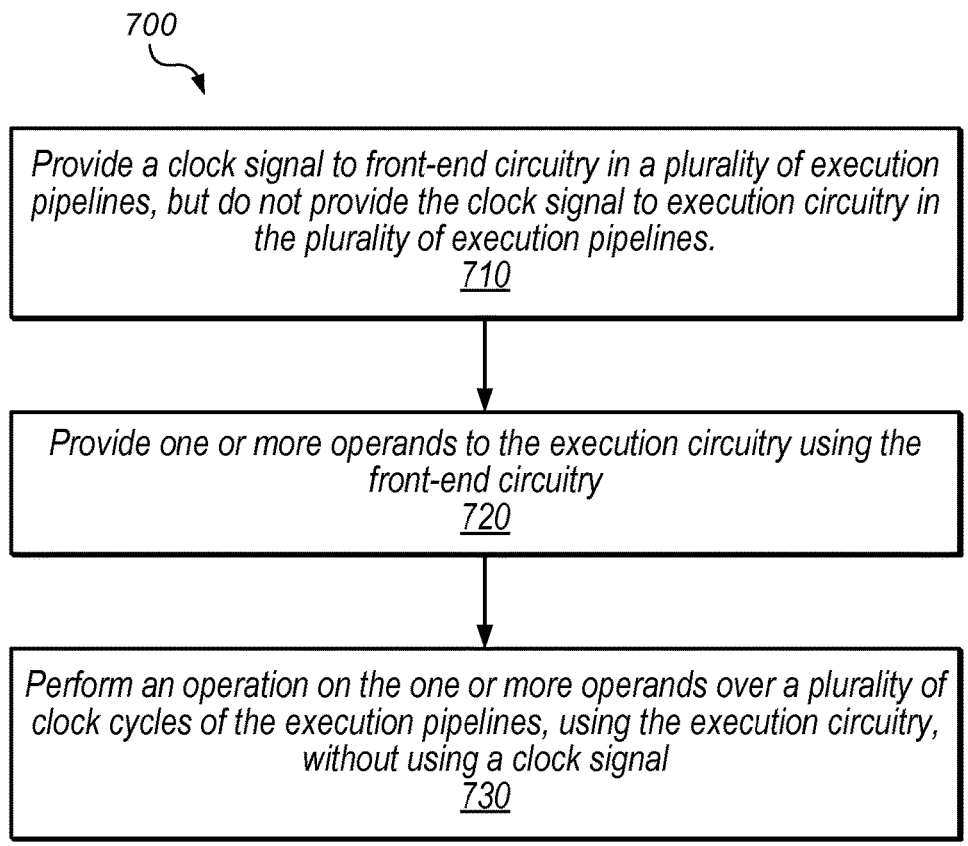
FIG. 7 is a flow diagram illustrating one embodiment of a method for executing instructions using non-pipelined execution units.

Referring now to FIG. 7, a flow diagram illustrating one exemplary embodiment of a method 700 for executing instructions using non-pipelined execution units is shown. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, a clock signal is provided to front-end circuitry in a plurality of execution pipelines, but not provided to execution circuitry in the plurality of execution pipelines. For example, in the embodiment of FIG. 5, a clock signal may be provided to control circuitry 510 but not to execution units 520. Flow proceeds to block 720.

At block 720, one or more operands are provided to the execution circuitry using the front-end circuitry. The operands may be accessed from a register file, from an operand cache, from a result of a previous operation, etc. The front-end circuitry may be pipelined and may use multiple clock cycles to provide the operands. Flow proceeds to block 730.

At block 730, an operation is performed on the one or more operands, using the execution circuitry, over a plurality of clock cycles of the execution pipelines. In this embodiment, the operation is performed without using a clock signal. This may allow layouts in which clock lines do not extend into execution units, reducing power consumption by clocking lines. Flow ends at block 730.

Figure 8:
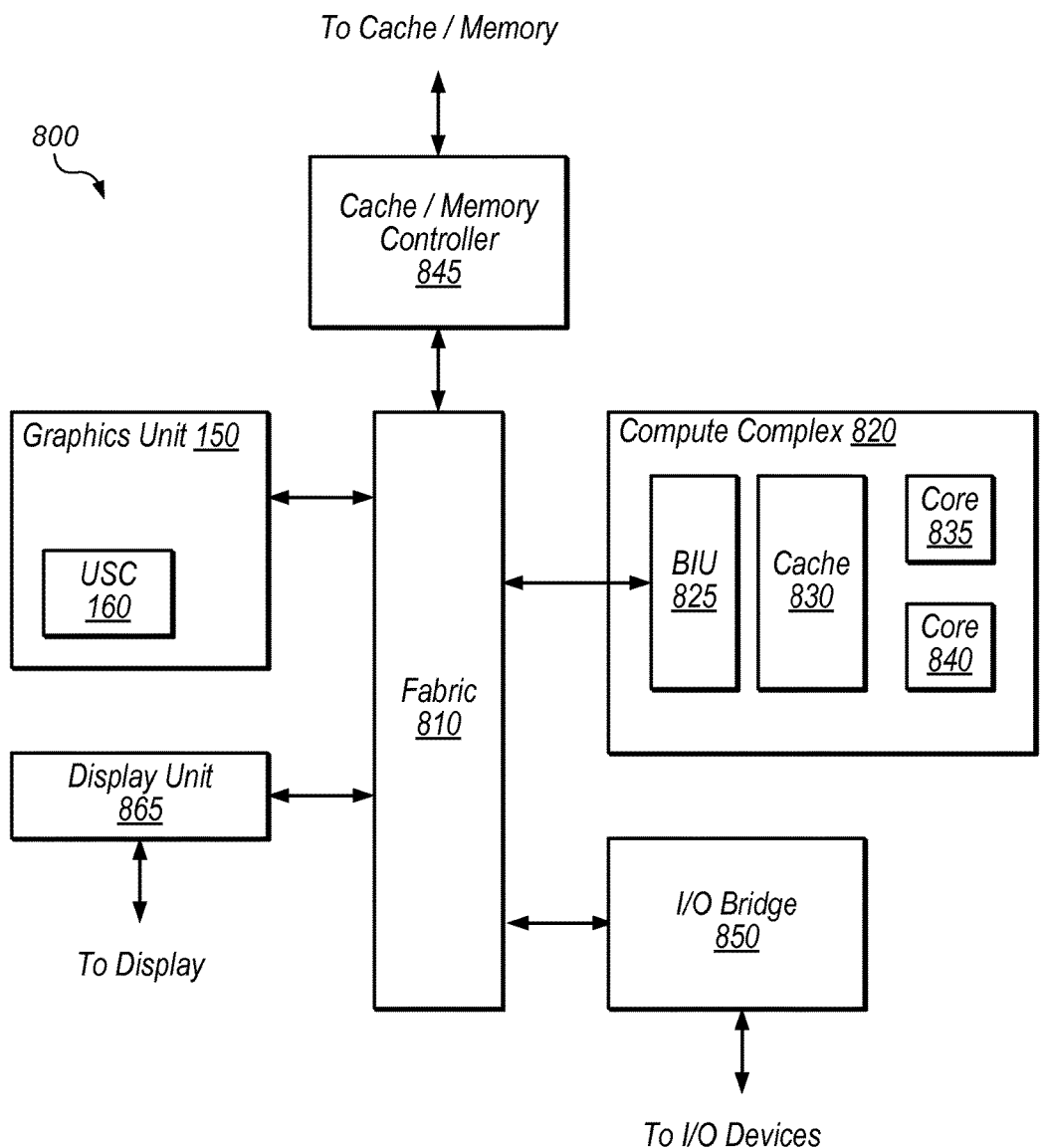
FIG. 8 is a block diagram illustrating one embodiment of a system that includes a graphics unit.

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 150, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may be configured as described above with reference to FIGS. 1B, 2, and 3. Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of execution pipelines physically located in at least first and second rows such that there is an intermediate region between the first and second rows, wherein the plurality of execution pipelines are arranged such that each of the plurality of execution pipelines has an inner portion that is closer to the intermediate region than an outer portion of that execution pipeline, wherein each of the plurality of execution pipelines comprises:
  pipelined circuitry physically located in the inner portion of that execution pipeline and configured to operate based on a clock signal; and
  one or more execution units physically located in the outer portion of that execution pipeline and configured to perform an operation without receiving a clock signal; and
one or more clock lines configured to provide the clock signal, wherein the one or more clock lines are physically routed through the intermediate region and extend into the pipelined circuitry but do not extend into the one or more execution units.

2. The apparatus of claim 1, further comprising:
clocked storage elements located between the pipelined circuitry and the one or more execution units in each execution pipelines, wherein the clocked storage elements are configured to store operands for the one or more execution units and results from the one or more execution units;
wherein the one or more clock lines do not extend beyond the clocked storage elements.

3. The apparatus of claim 1, wherein the one or more execution units include a plurality of execution units that are configured to perform operations for different threads and wherein the pipelined circuitry includes one or more operand caches and operand routing circuitry.

4. The apparatus of claim 1, wherein the one or more execution units are configured to generate execution results over multiple clock cycles of an execution pipeline.

5. The apparatus of claim 1, wherein the plurality of execution pipelines each includes one or more input clocked storage elements and one or more output clocked storage elements for each of the one or more execution units, and wherein each of the one or more execution units does not include clocked storage elements.

6. The apparatus of claim 1, wherein each execution pipeline further comprises one or more result buffers configured to store results of the one or more execution units for multiple clock cycles.

7. An apparatus, comprising:
a plurality of execution pipelines arranged in an array of respective first and second rows that are physically located such that there is an intermediate region between the first and second rows, wherein the first and second rows are arranged such that each of the first and second rows has an inner portion that is nearer to the intermediate region than an outer portion of that row, and wherein ones of the execution pipelines comprise:
  one or more combinational execution units each configured to perform an operation without receiving a clock signal;
  pipelined front-end circuitry configured to deliver operands to the one or more execution units and store execution results based on a clock signal;
  wherein the pipelined front-end circuitry is placed on the inner portion of the execution pipeline's row and the one or more execution units are placed on the outer portion of the execution pipeline's row; and
  one or more clock lines configured to provide the clock signal to the pipelined front-end circuitry, wherein the one or more clock lines receive signals from a clock line physically located in the intermediate region and wherein the one or more clock lines do not extend into the one or more execution units.

8. The apparatus of claim 7, wherein the one or more clock lines include a trunk line in each of the plurality of execution pipelines, wherein the apparatus further comprises clock gating circuitry configured to disable clock lines coupled to the trunk line in each of the plurality of execution pipelines.

9. The apparatus of claim 7, wherein the pipelined front-end circuitry includes separate lanes for providing portions of operands to the one or more execution units and wherein the one or more execution units are configured to produce results for the separate lanes.

10. The apparatus of claim 9, wherein the apparatus is configured to combine operands from the separate lanes when operating in a greater-precision mode and configured to separately use operands from one or more of the separate lanes when operating in a lower-precision mode.

11. The apparatus of claim 9, wherein the separate lanes include upper and lower portions of a register file, upper and lower portions of a result buffer, and upper and lower portions of operand routing circuitry.

12. The apparatus of claim 7, wherein the plurality of execution pipelines are graphics pipelines and wherein the plurality of execution pipelines are configured to perform a given operation in parallel.

13. A method, comprising:
providing a clock signal to front-end circuitry in a plurality of execution pipelines but not providing the clock signal to execution circuitry in the plurality of execution pipelines, using clock lines in an intermediate region between two rows of execution pipelines, arranged such that each of the plurality of execution pipelines has an inner portion that is closer to the intermediate region than an outer portion of that execution pipeline, wherein the front-end circuitry is located in the inner portion of each execution pipeline and wherein the execution circuitry is located in the outer portion of each execution pipeline, wherein the clock lines do not extend into the execution circuitry;
providing, using the front-end circuitry, one or more operands to the execution circuitry; and
performing, using the execution circuitry, an operation on the one or more operands without using a clock signal, wherein the performing is performed over a plurality of clock cycles of the plurality of execution pipelines.

14. The method of claim 13, wherein the performing the operation includes:
performing the operation for different threads using different execution units of the execution circuitry; and
generating execution results for the different threads in different clock cycles.

15. The method of claim 13, further comprising:
storing execution results from the execution circuitry in a result buffer for multiple clock cycles.

* * * * *